United States Patent [19]
Giannotti

[11] 3,725,271
[45] Apr. 3, 1973

[54] APPARATUS AND METHOD FOR SEPARATING PARTICLES FROM A FLOW OF FLUID

[75] Inventor: Hugo V. Giannotti, East Patchogue, N.Y.

[73] Assignee: Giannotti Associates, East Patchoque, N.Y.

[22] Filed: Nov. 24, 1970

[21] Appl. No.: 92,518

Related U.S. Application Data

[63] Continuation of Ser. No. 733,742, May 28, 1968, abandoned, which is a continuation of Ser. No. 340,913, Jan. 29, 1964, abandoned.

[52] U.S. Cl. ..........................210/65, 55/17, 55/21, 55/418, 55/434, 55/DIG. 14, 159/3, 159/6, 159/13
[51] Int. Cl. ..............................................B01d 57/00
[58] Field of Search ......210/65; 55/17, 21, 418, 434, 55/DIG. 14; 159/3, 6, 13

[56] References Cited

UNITED STATES PATENTS

| 1,519,428 | 12/1924 | Wilisch | 55/443 X |
| 1,944,547 | 1/1934 | Dansreau | 261/41 |
| 2,030,508 | 2/1936 | Falconer | 48/180 X |
| 2,152,115 | 3/1939 | Van Tongeren | 55/DIG. 37 |
| 2,289,474 | 7/1942 | Anderson | 55/17 |
| 3,279,155 | 10/1966 | Lambert | 55/430 X |

FOREIGN PATENTS OR APPLICATIONS

| 35,221 | 11/1908 | Austria | 55/396 |
| 134,745 | 9/1933 | Austria | 55/DIG. 37 |
| 442,410 | 3/1927 | Germany | 55/418 |
| 245,792 | 3/1926 | Italy | 165/98 |
| 794,834 | 5/1958 | Great Britain | 55/17 |

Primary Examiner—Dennis E. Talbert, Jr.
Attorney—Kenyon & Kenyon Reilly Carr & Chapin

[57] ABSTRACT

The disclosure relates to an apparatus and a method for separating salt from a brine solution for accelerating the brine solution through a nozzle member and subsequently decelerate the flow through a diffuser member. The acceleration and deceleration of the solution causes the brine to move into a predetermined stream portion of the flow. A tubular passage having its inlet disposed within the interior of the diffuser member intersects the predetermined stream portion and receives and thereby segregates the brine from the flow, whereby the remainder of the flow is water with a reduced concentrate of salt therein.

4 Claims, 13 Drawing Figures

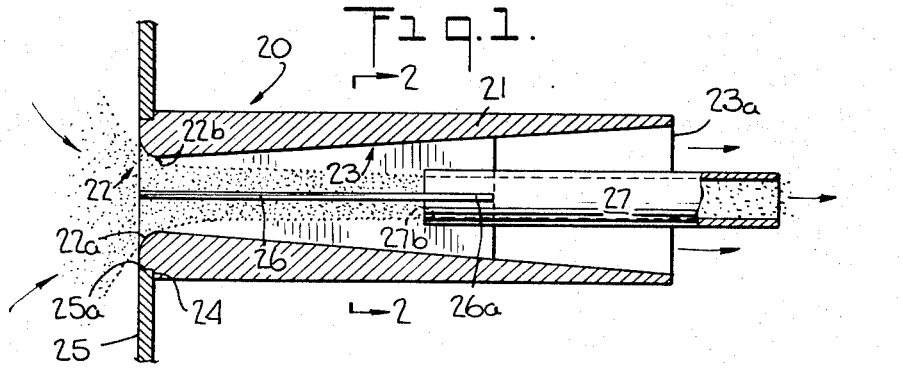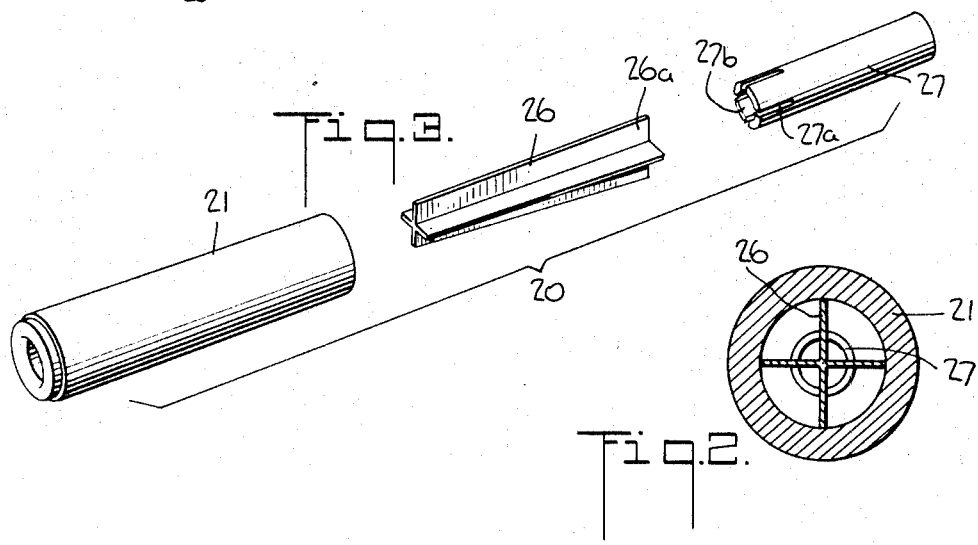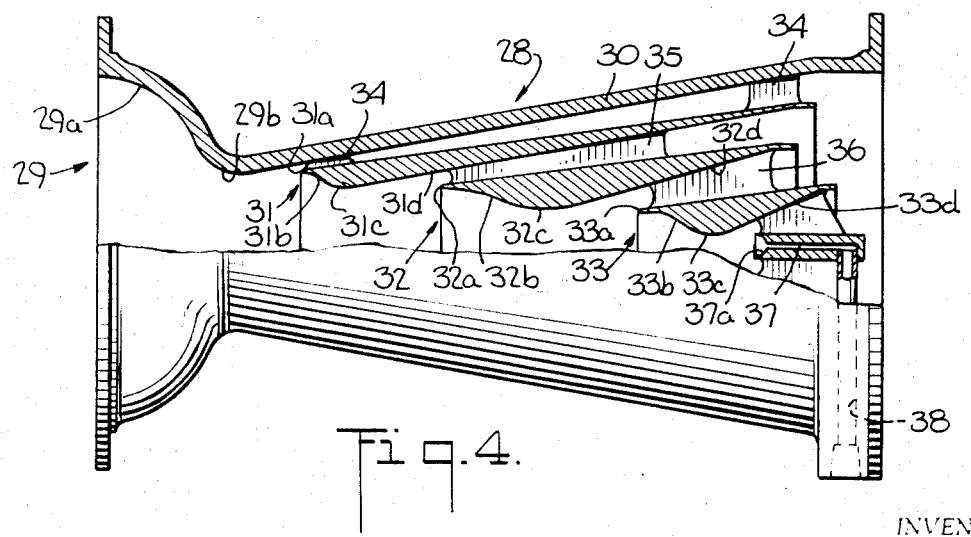

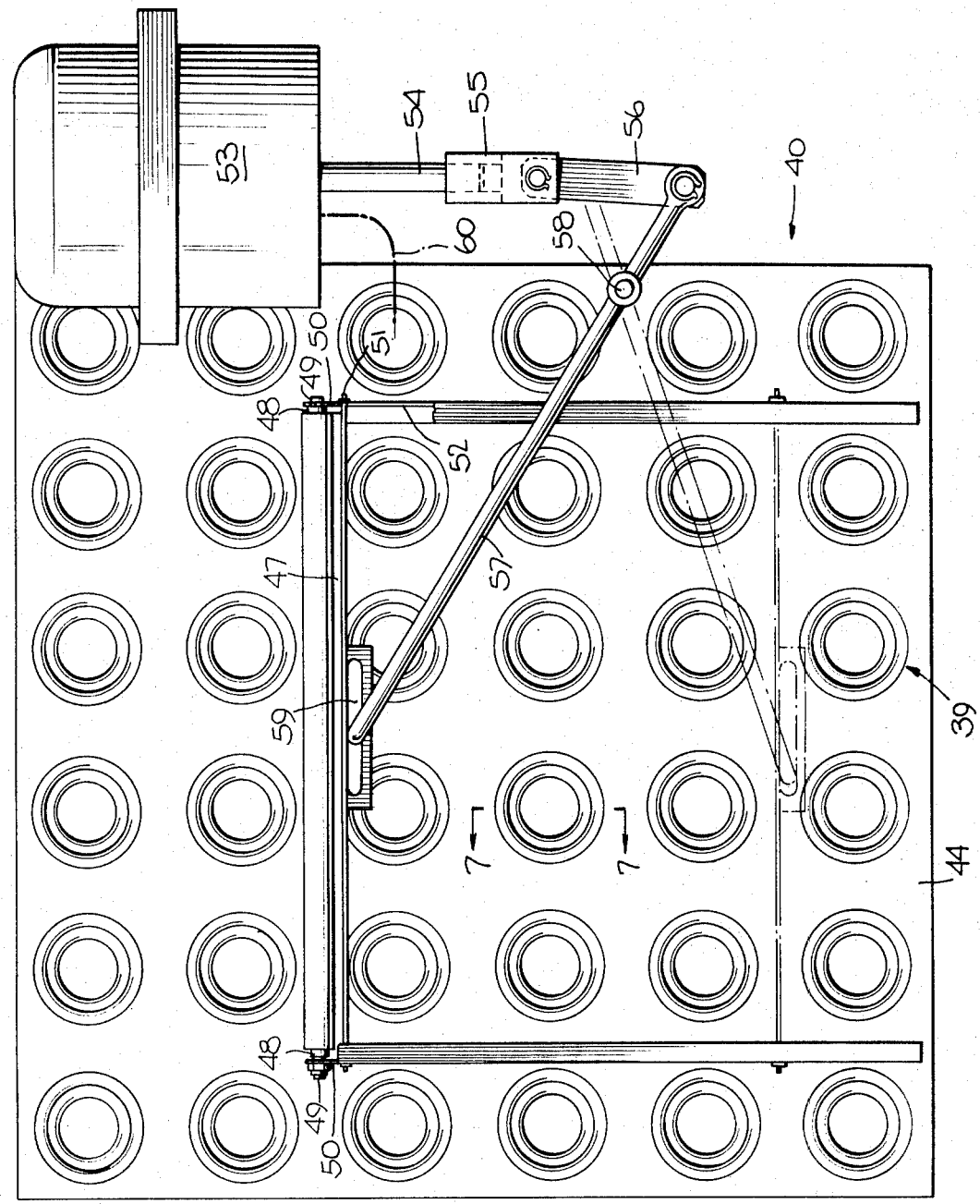

INVENTOR.
HUGO V. GIANNOTTI
BY Kenyon & Kenyon
ATTORNEYS

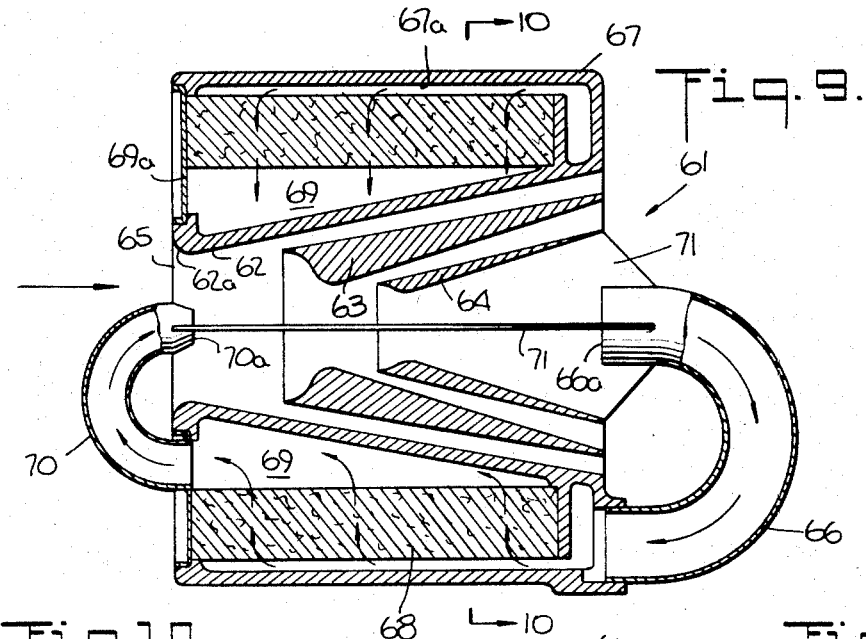
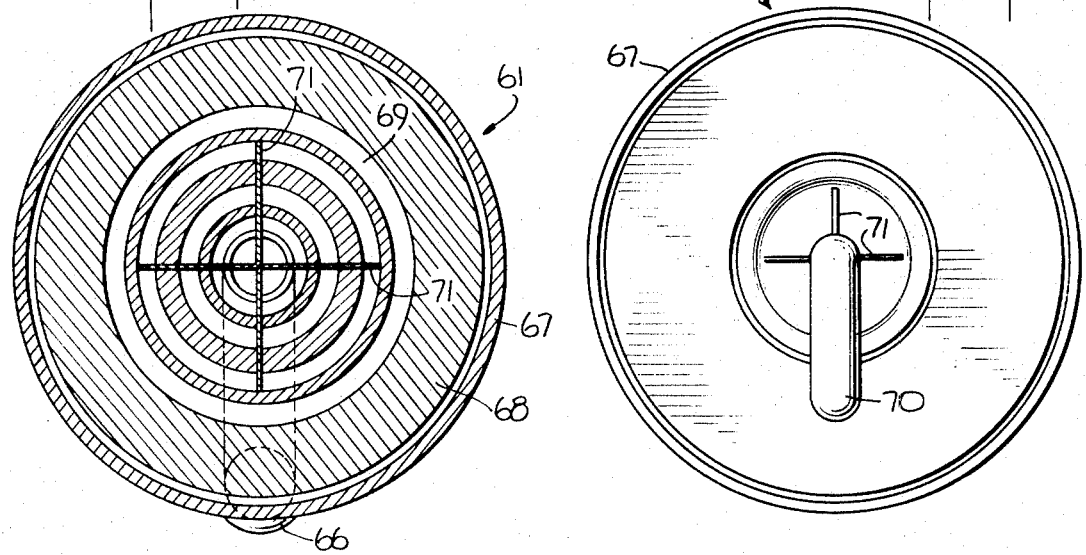
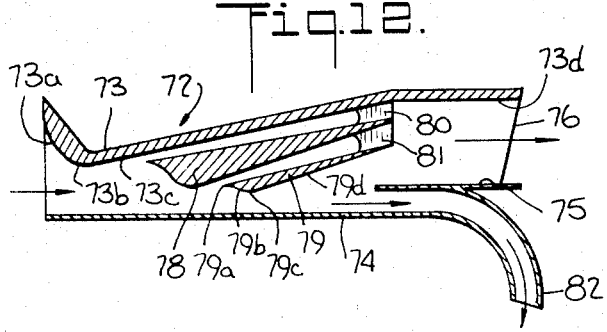
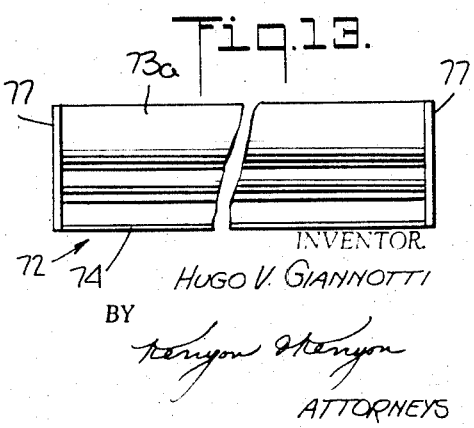
INVENTOR.
HUGO V. GIANNOTTI
BY
ATTORNEYS

APPARATUS AND METHOD FOR SEPARATING PARTICLES FROM A FLOW OF FLUID

This application is a streamline continuation of application Ser. No. 733,742, filed May 28, 1968, now abandoned, which was in turn a streamline continuation of application Ser. No. 340,913, filed Jan. 29, 1964, now abandoned.

This invention relates to a device for separating a substance of a greater density from another substance, and more particularly to a device for separating solid particles from a flow of gas.

Devices for separating substances of different densities in response to inertia forces have commonly been of the centrifugal or cyclone-type of separator. Cyclone separators remove solid particles such as dust from a flow of air or other gas by subjecting the flow to a spiral-like motion during which centrifugal force urges the denser particles to move outwardly with respect to the gas in which they are suspended. Openings adjacent the outer portion of the cyclone separator remove the outer portion of the flow into which the denser particles have been concentrated. Because of the necessity of forcing the flow through a spiral path, cyclone separators are devices which inherently require a large space envelope and consequently they frequently penalize applications where space or weight is a prime consideration.

Equipment such as internal combustion engines must be operated with a flow of air that is relatively free from dust and other solid particles. In reciprocating engines, dust can become deposited in the lubricating oil and cause rapid wear. The passage of dust through gas turbine engines can erode the blades. In addition, the long and tortuous flow paths through cyclone separators can result in a substantial pressure drop across the separator which results in a power loss in the internal combustion engine connected to the separator. This is especially true in the case of gas turbine engines in which the performance is radically affected by changes in pressure and temperature at the air inlet to the engine.

It is an object of the invention to provide a device which can separate a substance of greater density from the flow of another substance and which is comparatively compact in relation to the quantity of flow of the substances through the device.

Another object of the invention is to provide a device for separating a substance of greater density from the flow of another substance with the minimum of pressure drop occurring during the flow of the substances through the device.

Still another object of the invention is to provide a device for separating substances of different densities in which random and other undesirable flow patterns are prevented from interfering with the separating action.

An additional object of the invention is to insure that the separating device is capable of operating efficiently over a range of flow conditions.

Another additional object of the invention is to separate denser substances suspended in a portion of the flow of another substance through the device and subsequently to return the portion of the flow to the flow of the other substance after the denser substances have been removed therefrom.

A further object of the invention is to provide a relatively compact device for separating dust particles from a flow of air flow with a minimum of pressure drop across the separating device.

It is also an object of the invention to provide a device to separate the salt in the form of brine from salt water in response to the pressure and temperature changes in the flow of the salt water.

In addition it is an object of the invention to separate water from a fluid in response to the formation of condensate or ice in the flow of the fluid passing through the device.

In one embodiment of the invention the device for separating a substance of greater density from another substance comprises means for producing a flow of the substances along a curvilinear path. The flow of the substances has a predetermined stream portion therein. In response to the flow along the curvilinear path, the substance of greater density moves relative to the other substance in a direction extending away from the center of curvature of the curvilinear path and toward the predetermined stream portion. Means are connected to the flow producing means for diffusing the flow of substances passing therefrom. In addition, means are provided for segregating the predetermined stream portion of the flow containing the substance of greater density. The segregating means is disposed in the diffusing means substantially in the path of the predetermined stream portion. The remainder of the flow which comprises the other substance passes from the diffusing means.

By flowing the substances along a curvilinear path, the resulting inertia forces move the substance of greater density into the predetermined stream portion. The provision of the diffusing means serves to decelerate the flow and to enable the predetermined stream portion to be received by the segregating means. This arrangement lends itself to compact construction. In addition the diffusing means enables the pressure drop to be held to a very low level.

In another embodiment of the invention, the device comprises a nozzle member having a contracting portion and a throat portion. In the contracting portion, the substance of greater density is moved relative to the other substance of the flow in a direction extending away from the surface of the contracting portion and into the predetermined stream of the flow. A diffuser member connected to the throat portion of the nozzle member serves to decelerate the flow so that the predetermined stream portion can be received by the segregating means while the remaining portion of the flow passes out of the diffuser portion.

In still another embodiment of the invention, there is provided a separating device having a plurality of separator elements disposed spaced apart in a nested relationship with one another along the longitudinal axis of the device. The opening of the contracting inlet portion of the inner separator element of a pair is substantially in alignment with the opening of the throat portion of the nozzle member of the other separator element of the pair. This arrangement serves to place a plurality of elements in a cascaded configuration which serves to concentrate progressively the predetermined stream portion which contains the substance of greater density to be separated.

In an additional embodiment of the invention, means are provided for dividing the diffuser member into a plurality of passages extending in a substantially axial direction therethrough. The provision of axial passages prevents random flow patterns and turbulence which could otherwise disrupt the formation and maintenance of the predetermined stream portion containing the substance of greater density.

In a further embodiment of the invention there is included a plurality of separator units disposed adjacent to one another. Each of the units includes one or more separator elements. In addition there is included means for selectively blocking the path of flow to a portion of the plurality of separator units. This arrangement enables the flow through the other portion of the separator units to be maintained at a predetermined operating point even though the overall flow condition through the plurality of devices is varied.

In still a further embodiment of the invention means are provided for filtering the predetermined stream portion of the flow and means are provided for returning the filtered flow to the nozzle member of one of the separator elements. In this way the device is capable of self-inducing the flow of the predetermined stream portion necessary to segregate the substance of greater density from the other substance in the flow.

In accordance with another embodiment of the invention salt water is caused to flow through the separator unit at a temperature which results in boiling off of fresh water at the throat section of the nozzle member. The fresh water being the lighter fraction moves outwardly while the brine being the heavier fraction is urged toward the center of the separator unit.

In accordance with a further embodiment of the invention the passage of a fluid through the separator unit at high velocity results in a lower temperature which condenses or freezes the water from the fluid and in response to the greater density of the resulting condensate or ice, it is separated from the fluid.

Other objects and advantages of the invention will become apparent from the following description taken in conjunction with the accompanying drawings in which:

FIG. 1 is a vertical section view of an embodiment of the separator element of the invention;

FIG. 2 is a transverse vertical section view taken along the line 2—2 in FIG. 1 and showing the baffles disposed in the diffuser of the separator;

FIG. 3 is an exploded perspective view of an embodiment of the separator element;

FIG. 4 is a vertical section view of a separator unit having a plurality of separator elements nested in a spaced apart relationship with respect to one another;

FIG. 5 is a front elevational view of a plurality of separator units provided with means for selectively blocking the path of flow to a predetermined portion of the plurality of separator elements;

FIG. 9 is a vertical section view of a separator device in conjunction with a filtering device;

FIG. 10 is a vertical section view taken along the line 10—10 in FIG. 9 and showing the concentric arrangement of the nested diffusers and the filtering element;

FIG. 11 is a front elevational view of a separator device with a filtering arrangement showing the inlet portion of the separator device;

FIG. 12 is a vertical section view of a separator device in which the portions forming the nozzle and diffuser members are spaced apart from an adjacent substantially flat side wall; and FIG. 13 is an elevational view showing the outlet of the substantially rectangular nozzle and diffuser arrangement of the separator device of FIG. 12.

Figure 6:
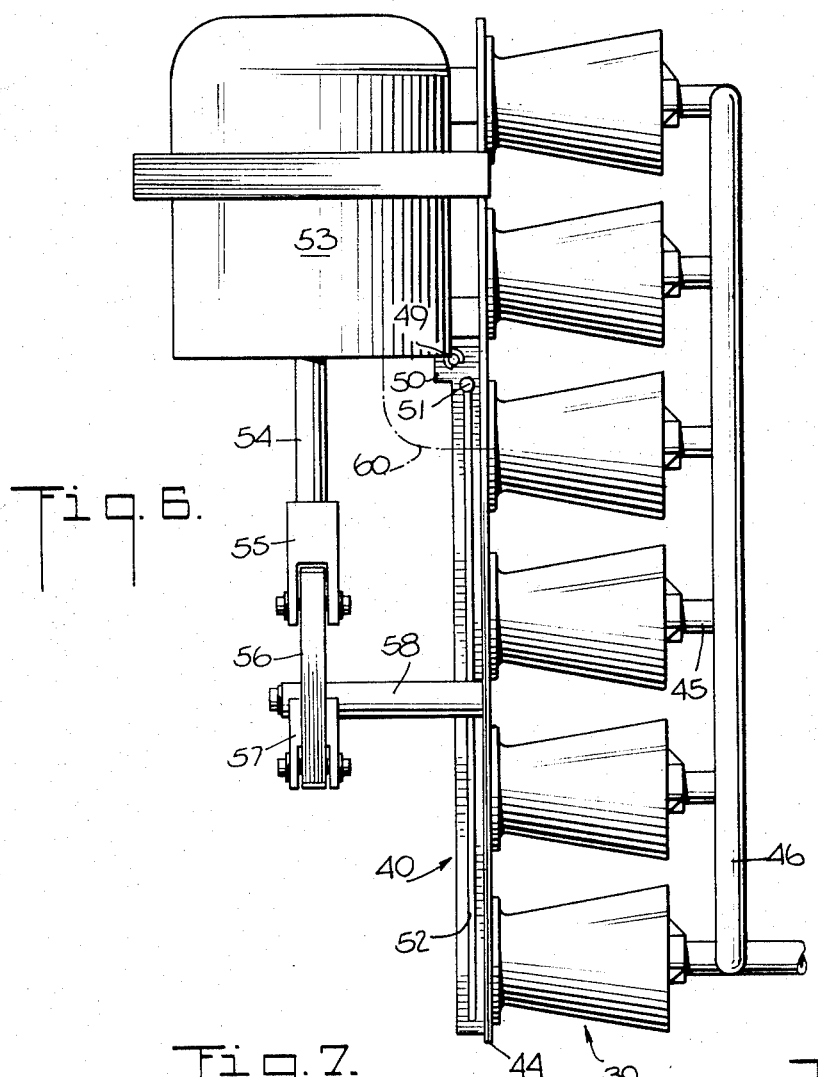
FIG. 6 is a side elevational view of the plurality of separator units showing the means for connecting together the collector tube of each of the separator units.

Separating device or separator unit 20 (FIG. 1) includes body portion 21 which contains nozzle member or nozzle 22 and diffuser member or diffuser 23. Nozzle 22 includes converging portion 22a and throat portion 22b from which diffuser 23 extends. Body portion 21 can be provided with annular shoulder 24 in order to fit into opening 25a in wall 25. Separator unit 20 further includes baffle 26 which can be cruciform in shape and extend along a portion of the length of diffuser 23. The separator unit also includes collector tube 27 engaged to end portion 26a of baffle 26 by slots 27a and extending beyond outlet opening 23a of the diffuser.

In operation separator unit 20 is subjected to a flow of one substance, such as air, containing a substance of greater density therein, such as dust particles. The region to the left of wall 25 as shown in FIG. 1 can be subjected to an increased positive pressure with respect to the pressure condition adjacent to outlet opening 23a of the diffuser in order to force a flow of fluid into nozzle 22 and through the diffuser of the separator. Other means can be utilized to force a flow of fluid into nozzle 22 and subsequently through the diffuser such as the forward motion of a vehicle upon which the separator is mounted. On the other hand, flow can be induced through the separator by suction applied at outlet opening 23a of the diffuser. This type of operation arises when the separator unit is coupled to the air intake system of an internal combustion engine.

Converging portion 22a of nozzle 22 serves as the means for producing a flow along a curvilinear path, that is, a path extending substantially parallel to the surface of the converging portion of the nozzle. Thus as dust-laden air enters nozzle 22 and the flow is converged toward throat 22b, the dust particles, as they negotiate the radius of the converging portion, will have imparted to them a radial inward force and consequently a radial inward velocity from impulse relations. The vector velocity resulting from the axial velocity and the radial inward velocity will be directed at an angle to the main stream, that is at an angle to the longitudinal axis of the nozzle. In this way, the substance of greater density, such as dust particles, in response to the flow along the curvilinear path, move relative to the other substance of the flow, such as air, and extend away from the center of curvature of the curvilinear path and toward the predetermined stream portion which is formed adjacent to the longitudinal axis of the separator unit.

As the air and dust particles proceed past the nozzle throat, the dust particles are maintained in a stream portion adjacent to the longitudinal axis of the separator unit. Since there is no static pressure gradient in diffuser 23 in a direction normal to the flow axis, there consequently is no pressure force to move the particles in an outward radial direction toward the surface of the diffuser. Thus in spite of the outward diffusing of the clean air, that is a deceleration of the air with an accompanying increase in pressure, the dust particles remain in the stream portion centrally disposed within the separator.

By selecting the inside diameter of opening 27b of the segregating means or collector tube 27 to correspond substantially to the diameter of the stream portion, the stream portion containing the dust particles can be received by the collector tube and thereby be segregated from the dust-free remainder of the flow passing through the diffuser. Where the dust particles are sufficiently heavy and where the vector velocity resulting from the axial velocity and radial inward velocity in the converging portion of the nozzle are sufficiently great, the dust particles can be directed into throat 22b at sufficiently great an angle that the dust particles pass through the stream portion being formed along the central axis of the separator unit. In such a case, the dust particles would not pass into inlet opening 27b of the collector tube. Thus dust particles could be directed from one side of the separator unit adjacent to the nozzle portion toward the other side of the separator adjacent the diffuser portion and thereby pass outwardly with the otherwise clean air. To prevent such a flow pattern the separator unit is provided with baffles 26 which extend along the length of the diffuser and the nozzle up to the inlet portion of the collector tube. Baffles 26 which can be cruciform-shaped not only prevent cross-flow of the larger particles into the clean air stream, but also act as straightening vanes which eliminate any whirl of the flow of air and dust particles as they pass into the nozzle.

An advantage of a separator unit including the nozzle and diffuser arrangement is that by decelerating the flow the diffuser is capable of recovering a major portion of the pressure drop which occurs in the nozzle as the flow is accelerated. Therefore the flow only experiences a relatively low overall pressure drop during its passage through the separator unit. In this way a flow of clean air can be delivered to an internal combustion engine, such as a gas turbine, with a minimum pressure drop.

Separator 28 (FIG. 4) includes an outermost separator element of nozzle 29 having hemispherically converging portion 29a and throat portion 29b. Hollow conical diffuser 30 of the outermost separator element extends from throat portion 29b of the nozzle. Disposed within diffuser 30 in a nested fashion and spaced apart from one another along the longitudinal axis of separator unit 28 are a plurality of additional hollow conical separator elements 31, 32, and 33. Radially extending struts 34-36 support and space separator elements 31-33 with respect to diffuser 30 and one another. The included conical angle of each separator element which is the angle included between the opposite wall portions of an element can vary from the greatest angle at the outermost element to the smallest angle at the innermost element. As shown in FIG. 4 the conical angle generated by the outer surface of diffuser 31d is less than the conical angle between the outer surface of diffuser 33d.

Separator element 31 includes edge portion lip 31a from which extends converging inlet portion 31b and subsequently throat portion 31c. Diffuser 31d comprises the remainder of separator element 31. Separator element 32 includes lip 32a, converging inlet portion 32b, throat portion 32c, and diffuser 32d. In a similar manner, separator element 33 includes lip 33a, converging inlet portion 33b, throat portion 33c and diffuser 33d.

As shown in FIG. 4 the lip of the inner separator element of an adjacent pair of separator elements is disposed substantially in alignment with the surface of the throat portion of the nozzle of the other separator element of the pair. After passing through nozzle portion 29b, the flow is diffused within diffuser 30 while the stream portion of the flow containing the dust particles remains substantially of the diameter of nozzle portion 29b. Consequently, the stream portion advances within lip 31a and subsequently passes through throat portion 31c where the stream portion containing the dust particles is again reduced in diameter. The reduction in diameter at throat portion 31c again reduces the diameter of the stream portion containing the dust particles so that it can pass into lip 32a and subsequently be reduced by throat portion 32c. The funneling action which reduces the stream portion containing the dust particles continues through separator 33 so that the stream portion is finally reduced in diameter by throat portion 33c in advance of collector tube 37. As the flow passes any given throat portion, the stream portion containing the dust particles advances with the diameter thereof substantially corresponding to the diameter of the throat portion. At the same time the remaining portion of the flow can diffuse outwardly and pass without the lip of the next succeeding separator. Thus air flow stripped of dust particles is progressively routed outwardly by the separator elements and removed from the remaining stream portion containing the dust particles.

Collector tube 37 can be provided with bell mouth 37a to facilitate the interception of the stream portion containing the dust particles which extends beyond throat portion 33c of the innermost separator element 33. Passage 38 connected to collector tube 37 conducts the flow containing the dust particles to a receiver (not shown). The plurality of nested separator elements, which are in effect a plurality of stages of separation, enables the overall separator unit to operate with a minimum of pressure drop and in an efficient manner since the progressive reduction in the diameter in the stream portion containing the dust particles minimizes the amount of flow that is carried off during the segregating action. The plurality of nested separator elements not only provides the basic advantage of substantial recovery of dynamic head through the efficient diffuser arrangement, but also the cascade effect of the multiple nozzles, by virtue of solidity, results in larger diffusing angles and consequently in a shorter diffuser for a given area ratio. Thus, the overall dimensions of the separator device can be maintained within limits which are required by the power plants of transportation equipment and the like.

Figure 7:
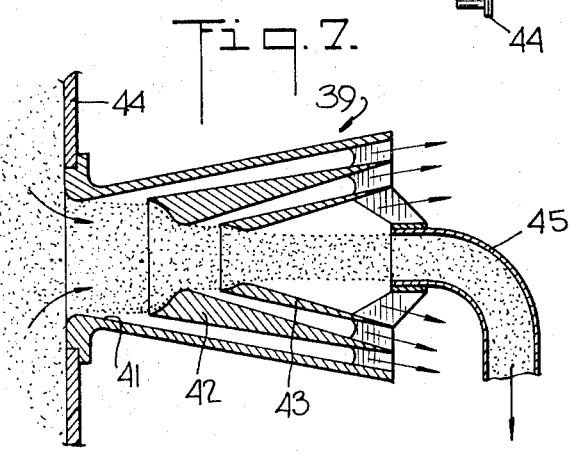
FIG. 7 is a fragmentary vertical section view taken along the line 7—7 in FIG. 5 and showing one of the separator units of the plurality.
Figure 8:
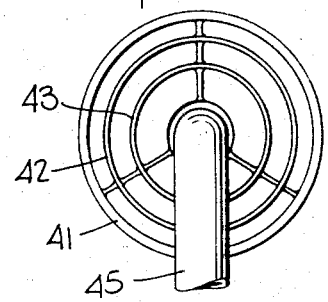
FIG. 8 is a rear elevational view of one of the separator units of the plurality in FIG. 5.

However very high velocities can result in excessive pressure drops. The construction of separator system 40 can be simplified and often made more compact by employing a plurality of separator units 39 (FIGS. 5 and 6), rather than one large unit. With such an arrangement only the number of units actually necessary to handle a given air flow need be used at one time. Each of separator units 39 (FIGS. 7 and 8) includes separator elements 41, 42, and 43 which are arranged in a nested fashion and spaced along the longitudinal axis of the separator unit. Each of separator units 39 can be mounted with its inlet portion adjacent support plate 44. Thus in the case of an engine installation, the air inlet to the engine extends about the plurality of separator units and is connected to support plate 44 so that the flow of air to the engine is induced through the separator units.

Collector tubes 45 which are aligned with the stream portions containing the dust particles and flowing through separator units 43 receive this portion of the flow and direct it to manifold 46. The manifold delivers the dust laden air to a receiver or the like (not shown). The air which flows into collector tubes 45, that is the secondary air of the separator units as opposed to the primary air which passes between the separator elements, can be induced to flow therethrough by connecting manifold 46 to a pressure level lower than that to the left of separator system 40 as shown in FIG. 6. In a similar manner, manifold 46 can be connected to an ejector device or to a suction blower in order to induce the flow of secondary air.

During operation of the engine or other air-consuming device connected to separator system 40, the volume of air flow required for each load condition can vary extensively. At lower air flow requirements, a fraction of the units can handle the flow more effectively. Where such a low flow condition is encountered, means can be provided for selectively blocking the path of flow to a predetermined portion of a plurality of separator units 39, that is to say, there is provided cover member or cover 47 which is adapted to block a major portion of the separator units (FIG. 5). Cover 47 is wound about roller 48 which is mounted by pivots 49 in frame member 50. Roller 48 is biased by a torsional spring or the like so that cover 47 is normally held in its retracted upper position as shown in FIG. 5. The free end of cover 47 is attached to rod 51 which is guided by the engagement of its end portions in groove 52 of frame member 50. The means for actuating cover 47 includes actuator 53 having a reciprocating output rod 54. Coupling 55 connected to rod 54 is pivotally attached to link 56. Operating rod 57 pivotally mounted about shaft 58 is engaged with slide 59 mounted on rod 51.

Vertical movement of output rod 54 by actuator 53 causes operating rod 57 to move about shaft 58 and thereby move cover 47 in a vertical direction as shown in FIGS. 5 and 6. The separator system may be provided with a pressure sensor 60 connected to the throat portion or a region adjacent thereto of a nozzle in a separator unit which is outside of the path of travel of cover 47 (FIG. 5). Pressure sensor 60 can be connected to a control unit (not shown) for actuator 53 in order to operate the actuator in response to a pressure condition in one of the separator units since the pressure therein is indicative of the velocity or the volume of flow through the separator system. Thus in response to the sensing of a pressure level indicating a reduced flow condition, the actuator can lower cover 47 to block the flow path to a portion of the separator units and thereby employ only the number of units necessary to handle the reduced flow. On the other hand, in response to the sensing of an increase in flow, actuator 53 can elevate cover 47 to bring additional separator units into operation and thereby distribute the flow through a greater number of active separator units.

Separator device 61 (FIG. 9) includes a plurality of nested separator elements 62-64 each having nozzles and diffusers. The air flow containing dust particles enters inlet 65 and passes with respect to separator elements 62-64. The stream portion containing the dust particles which is funneled to a reduced diameter by passing through the nozzles of the separator elements enters opening 66a in collector tube 66 which delivers the flow of secondary air containing the dust particles to cylindrical housing 67. Housing 67 which surrounds the assembly of separator elements contains cylindrical filter element 68 which is spaced inwardly from inner wall surface 67a of the housing. The flow of air and dust particles upon passing into filter element 68 deposits the dust particles therein.

Beyond filter element 68, the air with the dust particles removed therefrom passes into chamber 69 formed between the interior of the filter element and the diffuser of separator element 62. The end portion of chamber 69 adjacent to inlet 65 is closed by wall 69a. Tube 70 connected to chamber 69 conducts the flow of clean air through opening 70a which is adjacent to the throat portion of nozzle 62a of separator 62. Since this location is a low pressure point due to the effect of the flow through the nozzle of separator element 62, tube 70 is capable of inducing flow from collector tube 66 and through element 68 into chamber 69. In this way separator device 61 is capable of inducting its own flow of secondary air during flow through the separator elements. As shown in FIGS. 9-11 separator device 61 may be provided with baffles 71 having a cruciform shape and extending from inlet 65 to the outlet of the device adjacent to opening 66a of collector tube 66.

In another embodiment of the invention separator device 72 is substantially rectangular in form (FIGS. 12 and 13) rather than being formed from surfaces of revolution. The separator device includes plate 73 which is spaced at a distance from flat plate 74. Plate 73 includes converging portion 73a, throat portion 73b, diffusing portion 73c, and portion 73d which is substantially parallel to flat plate 74. Thus it can be seen that plate 73 forms a separator element with flat plate 74. Septum 75 extends substantially parallel to flat plate 74 and portion 73d to form outlet 76 from which the air after having been separated from the dust particles can pass. Septum 75 extends between end plates 77 of separator 72. Within the separator device, separator elements 78 and 79 having a substantially plate form and being supported by struts 80 and 81, respectively, provide additional stages of separation. Element 78 is provided with edge 78a, converging portion 78b, throat portion 78c and diffuser portion 78d. Similarly element 79 includes edge 79a, converging portion 79b, throat portion 79c and diffusing portion 79d.

During operation, separator device 72 segregates the dust particles into a stream portion of the flow which passes between septum 75 and flat plate 74 which is connected to the aperture or opening of rectangular tube 82 to a location where the dust particles are received. The clean portion of the air from which the dust particles has been removed is discharged through opening 76.

Since the separating element of the invention is capable of segregating a stream portion of the flow containing a substance of greater density, the separating element can be employed for removing at least a portion of the salt content in salt water. In accordance with the process of the invention, salt water is flowed through a separator unit such as unit 20 in FIG. 1. In passing through nozzle 22 the flow is subjected to a reduced pressure accompanying the increase in velocity. By selecting a temperature for the salt water which corresponds to the boiling point of fresh water at the reduced pressure in the nozzle section, the water will boil in the form of cavitation as it passes through the nozzle. The boiling action due to the difference in temperature of the boiling points of fresh water and salt will result in the production of fractions of fresh water and fractions of brine in the nozzle. The fresh water or lighter fraction in accordance with the invention will be urged outwardly while the brine or heavier fraction will be urged toward the center of the separating element. Thus the brine is directed toward collector tube 27 and thereby separated from the flow. The outwardly moving lighter fraction of fresh water in the form of bubbles produced by cavitation move outwardly upon passing beyond the nozzle and into the diffuser. The bubbles then encounter the increased pressure of the diffuser which causes the bubbles to implode and return to a flow of liquid which is a flow of water with a reduced salt concentration.

By way of an example a velocity in the nozzle of about 45 feet/sec. yields a pressure of about 2 psia. At this pressure, a temperature of about 126°F. causes boiling of the water. Consequently with these conditions separation of the salt from the flow of salt water can be achieved. As discussed previously, the separator units can be staged for progressive separation. Separation can be conducted in this way in an efficient manner since the heating requirements are low due to the low boiling point present in the reduced pressure region of the nozzle. In addition pressure losses of the moving liquid are minimized by virtue of the recovery in pressure effected by the diffuser, In addition the use of the separator unit of the invention for salt removal results in an arrangement which lacks a great deal of the complexity of equipment which is normally present in conventional systems for removing salt from salt water.

In a related manner the device of the invention can be employed for the removal of moisture from a flow of fluid. Thus upon passing a flow of gas or liquid through the nozzle of the separator unit of the invention, such as that shown in FIG. 1, the temperature of the fluid can be lowered in the region of high velocity at the nozzle. Where the velocity is sufficient to lower the fluid temperature below the dew point of water vapor or below the freezing point of water therein, the condensate or ice can be separate so long as its density is different from that of the remainder of the fluid. Thus in the case where the condensate or ice is denser then that of the remaining fluid the condensate or ice can be separated in a manner similar to that described for the separation of particles, such as dust, from a flow of fluid. Therefore in the unit of FIG. 1 the flow of condensate or ice would be separated by collector tube 27.

Although various embodiments of the invention have been shown and described herein, it is understood that certain changes within the scope of the appended claims may be made by those skilled in the art without departing from the scope and the spirit of this invention.

What is claimed is:

1. A method of separating a substance of greater density from another substance of lesser density comprising the steps of:

a. producing a flow of the substances;

b. inducing a flow of the substances along a curvilinear path, the flow having a predetermined stream portion therein, the stream portion adjacent the downstream end of the curvilinear path extending substantially adjacent a predetermined line, the substance of greater density in response to the flow along the curvilinear path moving relative to the other substance in a direction extending away from the center of curvature of the curvilinear path and into the predetermined stream portion;

c. decelerating the flow of the accelerated substances downstream of the curvilinear path by diffusing the flow of the substances, the flow of the substances being decelerated adjacent to the predetermined line;

d inducing a flow of the predetermined stream portion along another curvilinear path, the flow having another predetermined stream portion adjacent the downstream end of the other curvilinear path extending substantially adjacent to the predetermined line, the substance of greater density in response to the flow along the other curvilinear path being adapted to move relative to the other substance in a direction extending away from the center of curvature of the other curvilinear path and into the other predetermined stream portion;

e. decelerating the flow of the accelerated predetermined stream portion downstream of the other curvilinear path by diffusing the flow of the substances, the flow of the substances being decelerated adjacent to the predetermined line; and f. receiving and permanently segregating the other predetermined stream portion of the flow containing the substance of greater density adjacent the predetermined line from the remaining portion of the flow while the flow of the substances is being diffused.

2. A device for separating a substance of greater density from a flow of another substance of lesser density comprising:

a. a plurality of separator elements each including i. a nozzle member having a curved wall portion forming a longitudinal cross-section of the interior thereof which converges from the inlet to the throat portion of said nozzle member, when a flow of the substances passes through said device, said nozzle member being adapted to cause the flow thereof to move along a curvilinear path extending substantially parallel to said curved wall portion from adjacent the inlet to adjacent the throat portion of said nozzle member, the flow having a predetermined stream portion therein which adjacent the throat portion of said nozzle member extends substantially adjacent to a line extending from the inlet to the throat portion of said nozzle member and adjacent the central portion of the longitudinal cross-section thereof, the substances of greater density in response to the flow along the curvilinear path moving relative to the other substance of lesser density in a direction extending away from the center of curvature of the curvilinear path and into the predetermined stream portion;

ii. a diffuser member for inducing a deceleration of the flow of the substances therethrough, said diffuser member having an inlet connected to the throat portion of said nozzle member, the longitudinal cross-section of the interior of said diffuser member diverging from the inlet to the outlet thereof, a line extending from the inlet to the outlet of said diffuser member and adjacent the center portion of the longitudinal cross-section thereof being substantially in line and parallel to a corresponding line extending in said nozzle member, said diffuser member when a flow of the substances passes through said device being adapted to receive the predetermined stream portion from said nozzle member along the line extending from the inlet to the outlet of said diffuser member;

b. means for supporting said plurality of separator elements spaced apart and in a nested relationship with respect to one another along the length of said separating device, the inlet of said nozzle member of the inner separator element of any adjacent pair of said separator elements being disposed within the interior of the diffuser member of the outer separator element of said adjacent pair of separator elements and having an opening therein substantially corresponding to and being substantially in alignment with the opening of the throat portion of said nozzle member of the outer separator element of said adjacent pair of separator elements; and c. structure forming a tubular passage having an inlet disposed within the interior of said diffuser member of the innermost separator element of said plurality thereof and facing the throat of said nozzle member of said innermost separator element, the inlet of said tubular passage intersecting the line extending from the inlet to the outlet of said diffuser member of said innermost separator element and when a flow of the substances passes through said device receiving and permanently segregating the predetermined stream portion of the flow containing the substance of greater density from the remaining portion of the flow in said diffuser member of said innermost separator element.

3. A device in accordance with claim 2 in which:
a. the interior of said nozzle member has a substantially circular transverse cross-section; and
b. the interior of said diffuser member is substantially in the form of a frustum of a hollow cone.

4. A device in accordance with claim 2 in which said tubular passage has a transverse cross-section which is substantially constant along the length of said tubular passage.

* * * * *